United States Patent [19]

Cipriani

[11] 4,232,773
[45] Nov. 11, 1980

[54] SAFETY DEVICE FOR MECHANICAL ECCENTRIC CAM PRESSES

[76] Inventor: Renzo Cipriani, Fontanelle 52/d St., Fabriano, Italy

[21] Appl. No.: 882,420

[22] Filed: Mar. 1, 1978

[30] Foreign Application Priority Data

Mar. 14, 1977 [IT] Italy ................................. 611 A/77

[51] Int. Cl.² .............................................. F16P 3/18
[52] U.S. Cl. ................................. 192/131 R; 100/53; 192/134; 192/149
[58] Field of Search ............... 192/131 R, 129 B, 137, 192/148, 134, 130, 149; 100/53

[56] References Cited

U.S. PATENT DOCUMENTS

| | | | |
|---|---|---|---|
| 1,596,164 | 8/1926 | Eckert | 192/134 |
| 2,240,630 | 5/1941 | Stacy | 100/53 X |
| 2,946,277 | 7/1960 | Archer | 100/53 |
| 3,225,878 | 12/1965 | Estephanio | 192/134 X |
| 4,138,005 | 2/1979 | Schneider et al. | 100/53 X |

FOREIGN PATENT DOCUMENTS

| | | | |
|---|---|---|---|
| 471349 | 2/1951 | Canada | 192/134 |
| 45-10156 | 3/1970 | Japan | 100/53 |
| 329191 | 5/1930 | United Kingdom | 192/134 |
| 1021642 | 3/1966 | United Kingdom | 100/53 |

*Primary Examiner*—Rodney H. Bonck
*Attorney, Agent, or Firm*—Blair, Brown & Kreten

[57] ABSTRACT

A safety device for a mechanical cam press having a ram attached to a vertically extending shaft arranged for reciprocating movement and utilizing a brake and clutch for controlling the reciprocating strokes of the cam, the shaft including a stepped edge engageable by a pair of retractable slides arrange for horizontally reciprocating movement to retain the shaft and therefore the ram in the top, dead center position against downward movement toward with switch means actuated by a tripping device responsive to an inadvertent downward movement of the shaft from the top, dead center position to thereby engage the brake and disengage the clutch for avoiding injury to the operator.

9 Claims, 12 Drawing Figures

SAFETY DEVICE FOR MECHANICAL ECCENTRIC CAM PRESSES

This invention is a safety device which has the purpose of eliminating the possibility of accidents that may occur during manufacture with the use of mechanical cam presses.

BACKGROUND OF THE INVENTION

In spite of the many and diverse safety devices studied and provided by press manufacturers, the instances of accidents in this specific field of work to date, prove to be at a too high and unacceptable level.

Indeed the amputation of fingers, hands, or upper limbs is shown by statistics to be the most frequent type of injury.

The mechanical eccentric cam presses used in a vast range of application, in which cutting and bending are relevant, are essentially made of a press frame with one or two columns, and a simple slide, controlled by a cam shaft.

Having described the various ways of running in the operation of machines such as these, we will analyse the causes of accidents to understand how the device works to eliminate them. Presses usually can have three types of stroking.

INCHING STROKE

This stroke is obtainable by putting the switch on IAM. By pressing the control buttons the ram will start its descent; when the operator's hands are lifted from the buttons the ram will stop where it is. The buttons directly control the electropneumatic valve which regulates the entrance of compressed air to the clutch and to the brake. This stroke enables the ram to be stopped at any point in its downstroke or upstroke: it is generally used to try the press during the phase of setting up new die blocks.

SINGLE STROKING—INTERMITTENT STROKING

This is the type of stroke which is commonly used: obtainable by putting the switch on IN. To obtain movement it is necessary to press the control buttons and hold them pressed at least until the ram has reached bottom dead center, after which whether the buttons are kept pressed or released, the ram will always stop at top dead center.

CONTINUOUS STROKING

To obtain this cycle it is necessary to put the switch on CO. The machine works then continuously until the operator intervenes to stop it by actuating the central stop switch placed on the control panel. It is statistically proved that the great majority of accidents is due to return strokes (intermittent cycle) that is due to the fact that the ram, which through a limit switch ought to stop at top dead center (T.D.C.) starts accidentally a new unforeseen downstroke, catching the operator unawares.

SUMMARY OF THE INVENTION

We see now, with reference to diagrams to be explained from only a descriptive and unlimited point of view, the various components of the device, which comprise of:

shaft 1 with two sections of different diameter, so that it makes a stepped edge. This shaft 1 slides vertically and is guided in the cylinder 30;

a double acting hydraulic cylinder 2, with cut off valve closed by pneumatic cylinder 24;

the pneumatic cylinders 3 and 4 which control the advance of two slides 5 and 6. These cylinders 3 and 4 are fixed respectively to the two opposite walls of a box container 29 that surrounds the cylinder 30;

two pneumatic cylinders 7 and 8 which control through rods 25 and 26 the advance of two screws 9 and 10;

series of solenoid control valves E activated by microswitches M, operated by the appropriate cams, which will be examined in detail in the following.

DESCRIPTION OF THE PREFERRED EMBODIMENT

Figures 1, 2:
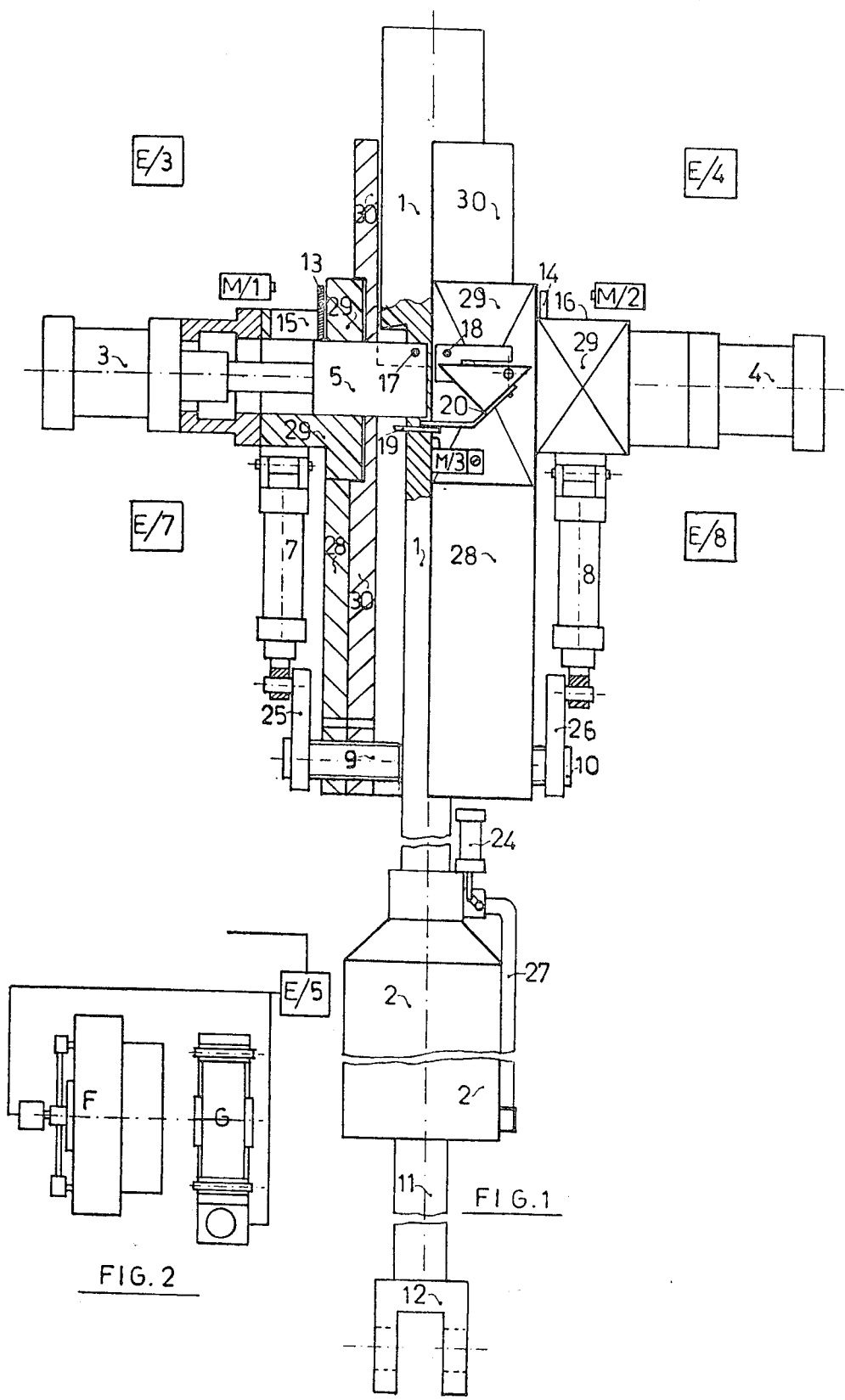
FIG. 1 is an elevation view, partially in section, of a portion of a mechanical cam press, illustrating the safety device of the invention.
FIG. 2 is a schematic showing of another portion of the mechanical cam press with which the invention of FIG. 1 is incorporated.

We look now how this device is installed and positioned, as this initial operation is essential for its good functioning.

The mounting on the press frame is made by a plate or by a support flange, depending on the case, welded on the cylinder 28 through which cylinder 30 is passed.

With a ratchet that crosses cylinder 30 and goes to the bottom of an annular ring made at the appropriate height on shaft 1, it is possible to stop this shaft in such a way that the above mentioned stepped edge is found exactly a few millimeters above the slides 5 and 6.

At this stage the rod 11 of the hydraulic cylinder 2, whose chambers are interconnected during this phase, is made to slide until it is possible to fix rod 11 to the ram, which was previously raised and stopped at T.D.C., by the fork 12.

After this, attention is paid to the cut off valve in tube 27, in order to eliminate flow between the upper and lower chambers of cylinder 2.

Once obtaining the rigid continuity between shaft 1, cylinder 2 and rod 11, the fixing ratchet is disengaged, such that the three above mentioned elements together can follow the ram along all its vertical travel.

With the safety device installed and positioned as above shown, we will consider its function in three modes of stroking: inching, intermittent, continuous.

The cycle starts with the ram stopped at T.D.C., in this, instance all is stopped as shown in FIG. 1.

Pressing the double control buttons, we obtain, through solenoid valves E/3 and E/4, directly connected to them, the activation of pneumatic cylinders 3 and 4, which make the respective slides 5 and 6 go back.

Only when there is contact of the pins 13 and 14 joined to the slides 5 and 6 and sliding inside windows 15 and 16, will they activate solenoid valve E/5, inserted in the main air supply, by the relative microswitches M/1 and M/2, which in turn permits the engagement of the clutch and release of the brake, and hence the descent of the ram.

As soon as the buttons are released we will have an immediate stop; in fact E/3 and E/4 will move forward the pistons of cylinders 3 and 4, such that M/1 and M/2 are released, producing through E/5 disengagement of the clutch and application of the brake.

FIG. 2 only shows solenoid valve E/5 in schematic form, inserted in the main compressed air line and connected to the actuator of the clutch F and brake G.

We consider now the function with intermittent stroking, distinguished by the fact that, once past the position of bottom dead center (B.D.C.), whether the control buttons are held depressed, or whether they are released, the ram will always come to rest at T.D.C. as mentioned before. The majority of accidents are caused during this phase and, it is the method used most commonly.

In fact the operator, confident in the regular functioning of the machine, does not wait for the ram to come to rest at T.D.C. but manages to accomplish the appropriate operation during the upstroke, hence subjecting himself like this to an inevitable accident should it be the case that the ram accidentally repeats its stroke.

The cycle always starts from the moment the control buttons are operated to obtain the descent of the ram, stopped at T.D.C.

The phase of descent is begun by the same method previously described in the inching stroke mode.

As soon as B.D.C. is passed, however, the electrical contacts are such that they automatically disconnect solenoid valves E/3 and E/4, so that the slides 5 and 6 start their travel forward yet stopping against the section of shaft 1 having the larger diameter, that continues its upstroke solidly with the ram.

Meanwhile always in intermittent stroking after B.D.C. is passed, the microswitches M/1 and M/2 are also automatically excluded, such that the solenoid valve E/5 will only be controlled from the end of the stroke fixed on the press and by the microswitch M/3, which we will see shortly.

Thanks to the initial and exact positioning, when the ram has reached T.D.C., the stepped edge on shaft 1 will be a few millimeters above the slides 5 and 6 that, not encountering further obstacle, will be able to complete their travel forward being stopped underneath the above mentioned stepped edge.

In the anomalous but possible case, in which the end of stroke position of the press does not function, there will be the repetition of stroke, in which the ram drags behind it with its rod 11, the cylinder 2 and the shaft 1, which therefore, after a few millimeters of travel comes to rest on the plates 22 and 23 that compress special springs 99 located under the plates around a circular ring 21 on the inside of the slides 5 and 6.

The plates 22 and 23 going down as well as the pins 17 and 18, and through levers 19 and 20, cause the tripping of microswitch M/3 connected to the solenoid valve E/5 which operates the brake G and disengages the clutch F.

The clearance between the stepped edge of shaft 1 and the upper surface of slides 5 and 6 must clearly be at minimum, in order to avoid high dynamic loads in the above mentioned slides.

Figure 12:
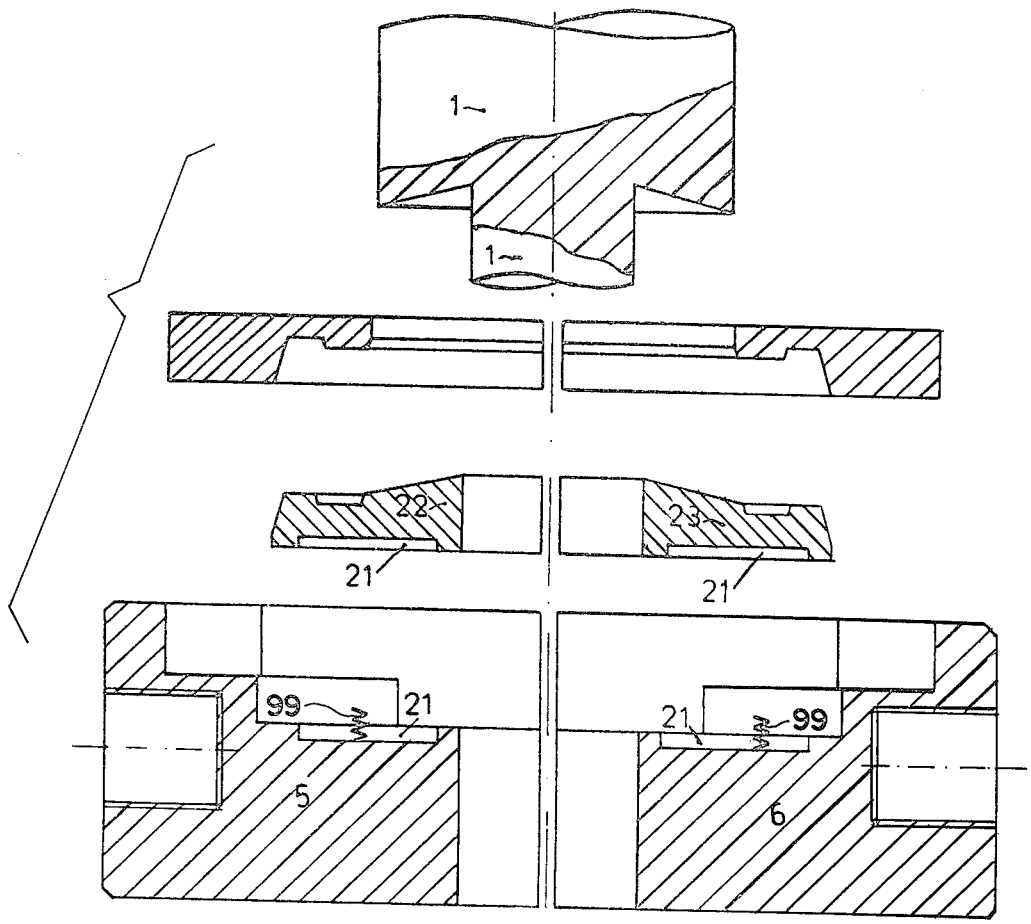
FIG. 12 is an exploded sectional view taken substantially along the line of A—A of FIG. 11 in the direction of the arrows.

The FIG. 12 shows sectioned in a vertical plane the various parts that are located inside the slides 5 and 6.

Knowing what has been said before, it will be possible to imagine the device working in the continuous mode, keeping in mind that in this case, the double control buttons being continuously depressed with an automatic arrangement, the solenoid valves E/3 and E/4 will always keep the slides 5 and 6 in a retracted position such that they do not interfere with the successive and continuous movements of the shaft 1.

Now we conclude the description, analysing the function of the small pneumatic cylinders 7 and 8 which are operated by the solenoid valves E/7 and E/8.

The satisfactory operation of the safety device as already said before, strictly depends on the initial exact positioning of the stepped edge of the shaft 1 with respect to the slides 5, 6 corresponding to the T.D.C. of the ram.

Therefor the device which we are looking at, serves to maintain the exact position of the above, when it is deemed necessary to make a vertical adjustment of the ram, that could alter the initial calibration.

When, in this circumstance, the control panel is operated with the switch in the position where it is possible to work the special small motor for vertical adjustment of the ram, the solenoid valves E/7 and E/8, which operate either cylinders 7 and 8 or cylinder 24, are automatically actuated, in such a way, that it is obtained on one hand, the feed forward of screws 9 and 10, which fixes the shaft 1 in the exact position, and on the other hand, the the opening of the ports of the valve connected with tube 27 between the two chambers of the hydraulic cylinder 2.

In this condition the shaft 1 remains fixed while the rod 11, sliding in cylinder 2, will be able to follow the vertical adjustment of the ram, and then be fixed in a new position, the adjustment completed, when, using the switch on the control panel the solenoid valves E/7 and E/8 are excluded with consequent withdrawal of the screws 9 and 10, and closing of the cutoff valve by the piston 24.

Having therefore described the device in its essential characteristics we want to point out, from now on the other alternative forms to the technical solutions described above, which complete the device and make it more versatile and more in keeping with dissimilar demands and requirements.

The first development was inspired for motives of compactness and size.

This concerns the movement forward of the slides 5 and 6, which in the first type of actuation are directly activated by two pneumatic cylinders 3 and 4.

Figure 3:
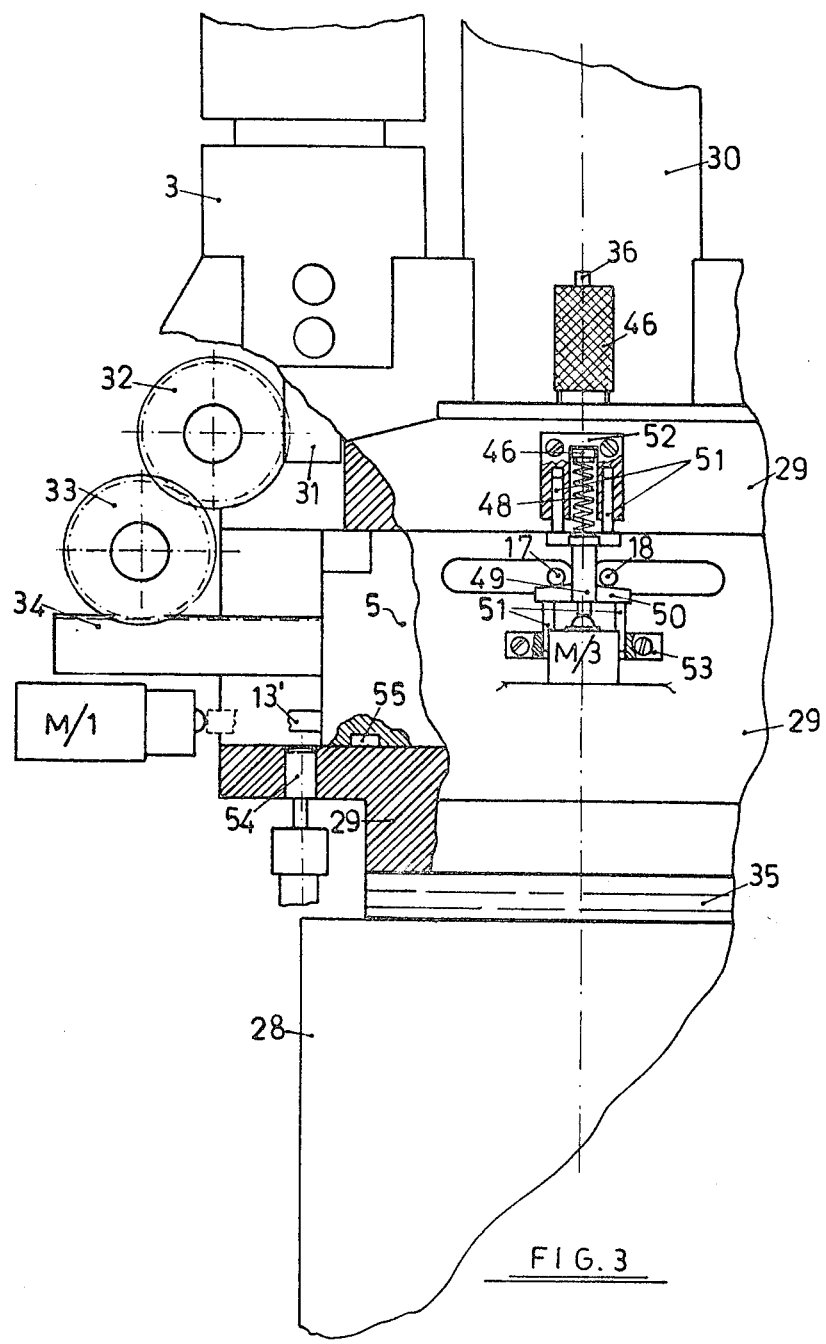
FIG. 3 is an elevation view of a portion of a mechanical cam press illustrating another embodiment of the safety device of the invention.

Referring to FIG. 3, that is a front view of the upper left part of the device, it is possible to see that the pneumatic cylinder 3 is now inclined vertically, and moves the rack 31, which, through two idler toothed wheels 32 and 33 transmit the movement to the rack 34 fixed to the slide 5.

Similarly the same applies for cylinder 4 and slide 6.

In this case, naturally, the microswitches M/1 and M/2 will not be tripped anymore by the pins 13 and 14 but by similar pins (13'), located in a different position.

Also in FIG. 3 a plastic ring is visible. This is placed between the body 29 of the device and the support cylinder 28, rigidly anchored to the press frame.

This piece of plastic material 35, clearly has the task of assisting the action of the damper springs contained in the two slides further counteracts any crushing suffered by the materials under load.

More interesting, instead, is the new actuating mechanism for the microswitch M/3, which, in the event of repeated stroke, is arranged to immediately operate the brake G and disengage the clutch F.

As pointed out already, in the installation phase and the initial positioning of the device on the press, care must be taken in such a fashion that, when the ram is at its T.D.C., the stepped edge on shaft 1 is found a few millimeters above the top surface of the plates 22 and 23.

Figure 4:
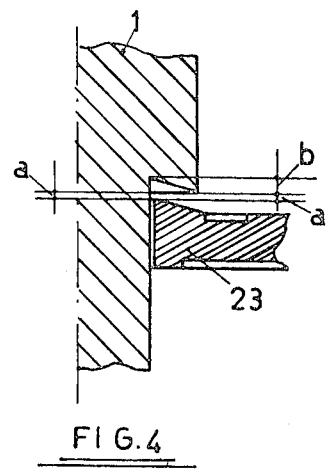
FIG. 4 is an enlarged sectional view of a portion of the safety device of FIG. 1.

With reference to FIG. 4 we can confirm that the tripping of microswitch M/3 will only happen after a stroke of the ram, starting from its T.D.C., equal to the sum of the sections indicated in (a), (b), plus the travel necessary to trip microswitch M/3 indicated in (c) in this description.

In the case where the ram works for low levels of stroke, the sum of (a)+(b)+(c), insignificant for presses with long strokes, could be enough for the ram to reach a reasonable velocity, resulting in a high kinetic energy which must then, be absorbed by the slides whose mechanical strength would be adequate.

In this case, even by reducing the section (a) to almost zero, the distance (b)+(c) would remain, which cannot be altered in any way.

Figure 5:
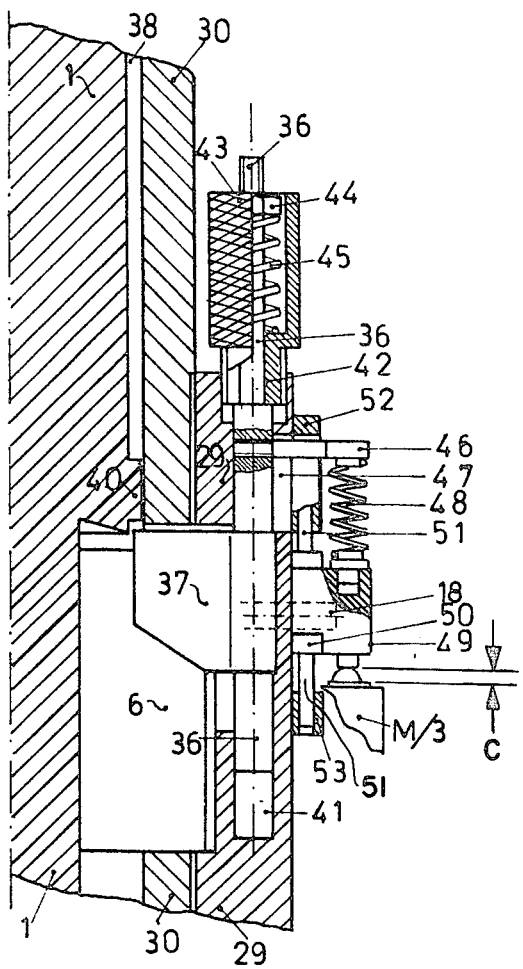
FIG. 5 is an enlarged sectional view of a portion of the embodiment of FIG. 3.

Here, the problem of advancing the tripping of microswitch M/3, solved by the device, is shown in FIG. 5, by a part-section of a vertical surface on the diameter of shaft 1.

The said mechanism consists of a cylindrical rod 36 on which is screwed and fixed, a laminated spring with two diverging wings 37, symmetrical with respect to a flat surface, curved to fit the rod 36.

Figure 6:
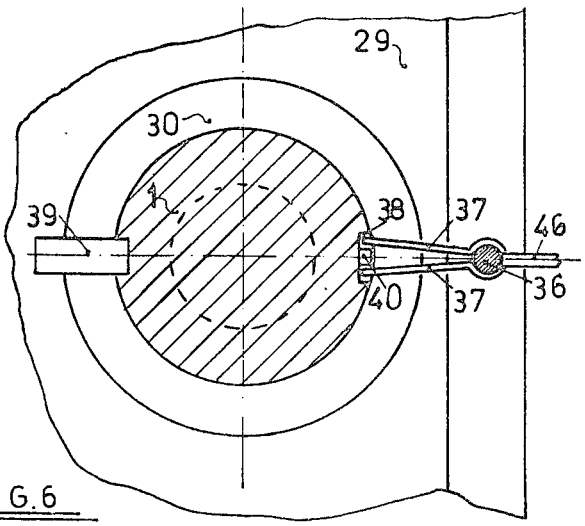
FIG. 6 is a fragmentary view, partially in section, of the embodiment of FIG. 5.

In this version, the shaft 1 shows externally, corresponding to the above spring, the front of a long longitudinal slot 38, while placed opposite on the diameter, a slot key 39 removes all possibility of the same shaft rotating around its vertical axis as shown in FIG. 6, indicating a simplified section of shaft 1 in a horizontal plane.

Before delving into the system's function, we will take into consideration the structure and manufacture of the entire mechanism.

The rod 36 can slide vertically guided inside circular housings 41 and 42, spaced, respectively on the body 29 and the upper sleeve 43, that is always bolted on the body 29.

The rod 36 is supported inside the sleeve 43 by the nut 44 and cylindrical helical spring 45.

A cross pin 46, screwed on the rod comes out horizontally from the body 29 where it has an appropriate opening 47.

The cross pin 46 through a cylindrical helical spring 48 mounted vertically, acts on the front rib 49 of the sliding block 50, which has been substituted for the system of independent levers 19 and 20 shown in FIG. 1.

The said block 50, made from a double "T" block, slides vertically and is guided by four ground guides 51, located in the supports 52 and 53, fixed to the body 29.

The rib 49, jutting out at the front, acts when descending, on the microswitch M/3.

We can now go on to examine the function of the device just described.

We know that when the ram is at T.D.C., the slides 5 and 6 are always in an advanced position and therefore under the stepped edge of shaft 1.

In this configuration, then, the wings 37, pressed one against the other are found closed underneath the central tooth 40, at a distance of a few millimeters fixable by unscrewing the adjustment sleeve 43.

In the unfortunate instance of a repeated stroke, the tooth 40 on the shaft 1, going down, carries the wings 37 below, and with this the rod 36, whose action, through the crosspins 46, the spring 48 and the rib 49 on, the microswitch M/3, disengages the clutch F and operates the brake G before the stepped edge of shaft 1 comes down on the plates 22 and 23.

The movement to trip M/3 becomes, therefore, completely independent from the distance (a) and from the distance (b), but is equal to the length (c) plus the adjustable distance, that occurs between the lower edge of the central tooth 40 and the upper edge of the wings 37.

It is evident that during the control function, the wings 37, in the drawing back of the slides 5 and 6 are separated, returning to the open position, so as to be able to assist, stationary behind the slot 38, the reciprocating strokes of shaft 1.

This device then, accomplishes its intended objects and is exceptionally useful whenever short strokes of the ram are employed.

With reference to FIG. 3 it can be seen with respect to the device shown in FIG. 2, that now a subsequent safety device is added, which comes into action when the press die blocks are changed.

This operation often involves a vertical adjustment of the ram which is done automatically or manually, by the provided adjustment method mounted on the press, and during which, the shaft 1 is fixed by the screws 9 and 10 controlled by the solenoid valves E/7 and E/8, actuated automatically by setting the switch on the control panel for the vertical adjustment of the ram.

In this circumstance the slides 5 and 6 are in a partially advanced position because their movement is obstructed by the section of large diameter on shaft 1.

Therefore in this case, it could be possible for the double buttons to be pushed, which in turn are connected to solenoid valves E/3 and E/4, operating on cylinders 3 and 4 which will cause the withdrawal of the slides 5 and 6, whose pins 13' and 14' at the end of the stroke, will trip the microswitches M/1 and M/2, that in turn actuate the solenoid valve E/5, inserted in the main compressed air supply, causing the descent of the ram.

The two pins 54, one for each slide prevent this happening and they, operated at the same time and independently by solenoid valves E/7 and E/8, locate in seats 55 when the slides are partially advanced in relation to the shaft 1.

In this case, in spite of accidental operation of cylinders 3 and 4, the slides cannot be withdrawn and, therefore, not having tripped the microswitches M/1 and M/2, the ram cannot come down.

Everytime it is necessary to vertically adjust the ram, the shaft 1 needs to be fixed in order not to alter its exact position in relation to the slides 5 and 6.

As we have already mentioned, by setting the switch on the control panel, which operates the small motor for adjusting the height of the ram, the solenoid valves E/7 and E/8 are automatically energized, and they operate the pneumatic cylinders 7 and 8, and cylinder 24.

Obtainable like this, on one hand, is the tightening of the grip screws 9 and 10 that fix the shaft 1, and on the other hand, according to the method shown in the FIG. 1, the opening of the cutoff valve that connects the two sides of the hydraulic cylinder 2.

We look now at what happens when setting the switch on the control panel according to the new method proposed.

Figure 7:
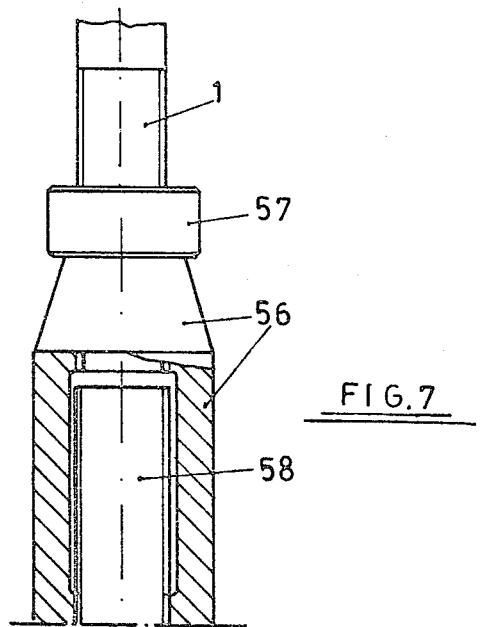
FIG. 7 is an elevation view, partially in section, of another embodiment of the safety device of the invention.
Figure 8:
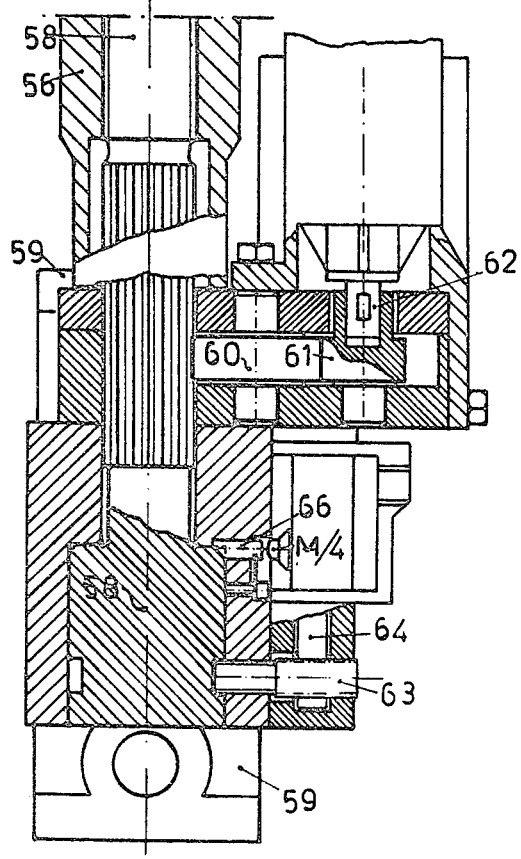
FIG. 8 is a side view, partially in section, of the embodiment of FIG. 7.
Figure 8:
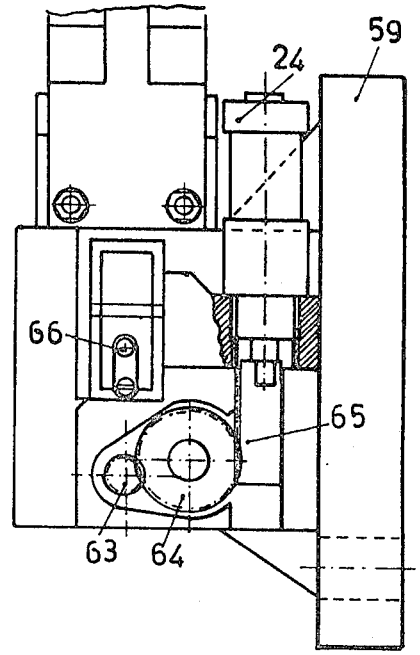

Before considering the function, we describe how this part of the device has been modified, of which FIGS. 7 and 8 are respectively a vertical sectional view and a side view.

Referring to these figures, the shaft 1 does not terminate now with the hydraulic cylinder 2, but with a threaded section on which is screwed a coupling 56, with anti-locknut 57.

Inside the same coupling 56 is screwed a shaft 58, that comes out from underneath the coupling presenting a central straight splined section, and following it below, a raised part of a final cylindrical section of enlarged diameter.

The section of shaft 58, that comes out from the coupling 56, and is found located inside the body of the strap 59 welded to the ram.

The splined section of shaft 58 engages with the toothed idler wheel 60, meshing with the drive wheel 61, driven by the drive spindle 62, which is always fixed to the body of the strap 59.

The fixing of the shaft 58 to the strap 59, is ensured by the pin 63 that shows one end threaded and the other splined, which engages with the straight toothed gear wheel 64, turned by the rack 65, that is moved by the pneumatic cylinder 24.

In the light of what has already been said, we now look at the function.

As mentioned before, by setting the switch appropriately on the control panel, solenoid valves E/7 and E/8 operate automatically and on one hand, they provide the fixing of shaft 1 in the exact position and on the other, pull out the fixing pin 63 through the cylinder 24.

By using then, anyone of the controls of the motor to adjust the vertical travel of the ram, one can meanwhile, operate the drive spindle 62, that makes the shaft 58 rotate, through the gears referred to above, and in this initial phase the shaft always undergoes a preset downward movement, independently, of a signal to raise or lower the ram.

After adjustment of the ram, by releasing the control of the adjustment motor, the drive spindle 62 automatically reverses its rotation, forcing the shaft to go back up into the coupling 56 until the edge of the lower section reaches its seat in the body of the strap 59.

This action is revealed by the limit pin 66 that trips the microswitch M/4, stopping the drive spindle 62.

By putting the selector on the control panel back to the initial position, the solenoid valve E/7 and E/8, operate again providing the movement of cylinder 24, and the freeing of shaft 1.

Figures 9, 10:
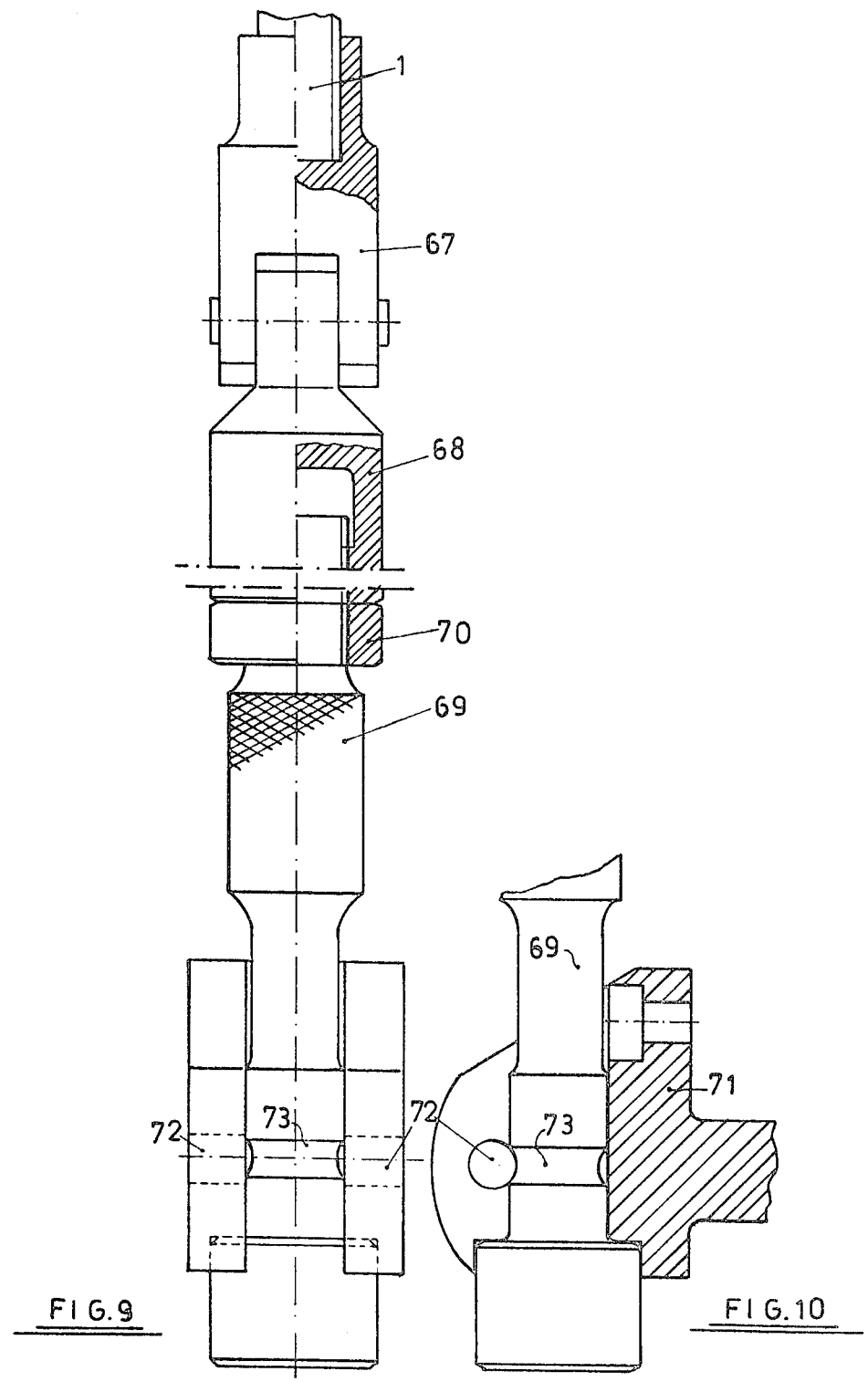
FIG. 9 is an elevation view, partially in section of still another embodiment of the safety device of the invention.
FIG. 10 is a side view, partially in section, of a portion of the embodiment of FIG. 9.
Figure 11:
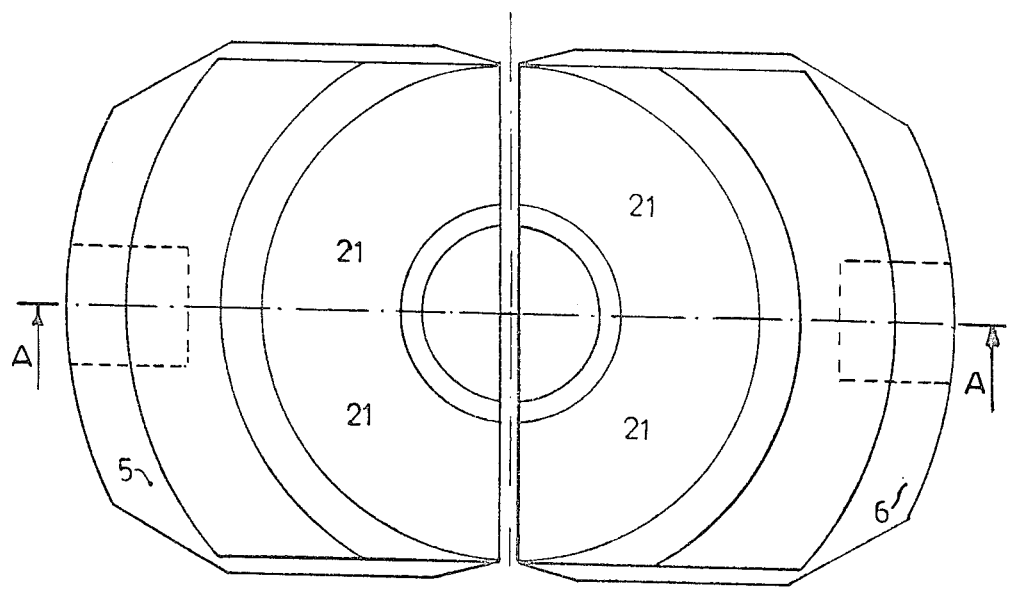
FIG. 11 is an enlarged plan view of a portion of the safety device of FIG. 1.

Another constructive solution for manual operation is added to the automatic device examined above, and shown respectively in FIGS. 9 and 10, the front and side views, partially sectioned.

According to this technical solution, the fork 67 is screwed onto shaft 1 and then hinged to the coupling 68, into which is screwed the rod 69, with the anti-locknut 70.

This cylindrical shaft 69 ends with a section of enlarged diameter, located in a shoulder and seat in the strap 71, rigidly anchored to the ram.

In this type, after fixing shaft 1 with the normal system, firstly, the stop pin is unscrewed from the holes 72, and secondly the rod 69 in unscrewed from a lower support and lifted up.

After adjustment of the ram, the rod 69 must be screwed in or out until the groove 73 on the rod 69 allows the passage of the stop pin through the holes 72.

The device has been described as such, in its favoured forms of use, but experts in the field can make modifications or variations in the fabrication of components without going outside the range of protection of present industrial patents.

Furthermore all the details may be substituted by elements, technically equivalent; in practice, the materials as well as the dimentions used, may be made in any case according to the requirement.

I claim:

1. A safety device for a mechanical cam press including a frame and a ram having dies arranged for vertically reciprocating strokes comprising, in combination, a vertically extending shaft, a double acting hydraulic cylinder having a piston rod connected at its upper end to the lower end of said shaft and at its lower end to the ram of the press whereby said shaft, said cylinder, and piston rod and said ram move together reciprocally as a unit, said shaft having a portion of reduced diameter forming a stepped edge, a pair of opposed, independent, horizontally moveable slides arranged for reciprocating movement between an advanced position and a retracted position, a pair of pneumatic cylinders operated by control means, means for connecting each of said pneumatic cylinders to one of said slides for moving the said slides reciprocally in opposite directions, said slides in said advanced position having a portion in underlying relationship with said shaft stepped edge with a clearance of a few millimeters in the top, dead center position of said shaft to thereby prevent the inadvertent downward movement of said shaft and therefore said ram by engagement between said stepped edge for said portions of said slides; and an interlock means, releasably engageable with said shaft for retaining said shaft in an initial position to permit vertical adjustment of said ram.

2. A safety device in accordance with claim 1 wherein said mechanical cam press includes a brake and a clutch operatively associated with said ram, means including a solenoid valve for connecting said brake and clutch to an associated source of compressed air, a first and second microswitch each associated with one of said slides and operatively connected to said solenoid valve, a pin on each of said slides engageable with said associated first and second microswitches in the retracted position of said slides for controlling the supply of compressed air from said source to said brake and clutch.

3. A safety device in accordnance with claim 2 wherein the upper surface of each of said slides is provided with a circular ring, a spring disposed in said circular rings and a plate disposed in overlying relationship with said spring, a laterally extending, horizontal pin on each of said plates, a pair of rotatable levers disposed adjacent a respective one of said pins, a third microswitch operatively connected to said solenoid valve mounted below said pair of levers, whereby during an inadvertent downward movement of said ram, said pair of levers are rotated by said pins into engagement with said third microswitch to actuate said solenoid valve to engage said brake and disengage said clutch, said slides being arranged to support the weight of said ram and to oppose the momentum of said ram during said inadvertent downward movement.

4. A safety device in accordance with claim 2 for use with a cam press having a relatively short ram stroke including a vertically extending rod, means on said frame for guidably supporting said rod for vertical movement, a laminated spring having a pair of divergent wings threadedly mounted on said rod in a fixed position, said wings being pressed together by said slides in the advanced position of said slides, a third microswitch operatively connected to said solenoid valve, tripping means on said rod engageable with said third microswitch during the downward movement of said rod, a radially extending tooth on said shaft, said tooth being engageable with said pressed together wings during an inadvertent downward movement of said ram to move said rod vertically downward for engagement of said tripping means with said third microswitch to actuate said solenoid valve to engage said brake and disengage said clutch.

5. A safety device in accordance with claim 1 including a support cylinder fixed to said frame for supporting said unit, and wherein said unit includes a box container and a guide cylinder for said shaft support on said support cylinder within said box container, said guide cylinder, said box container, and said shaft being removeably mounted on said support cylinder.

6. A safety device in accordance with claim 1 wherein said interlock means includes tube means for connecting together the chambers of said hydraulic cylinder, a cut-off valve in said tube means, a pneumatic cylinder for actuating said cut-off valve, a pair of screws moveable into retaining engagement with said shaft for retaining said shaft in an initial position, a pair of pneumatic cylinders each operatively connected to one of said screws for moving said screws into and out of said retaining engagement with said shaft, switch means including a pair of solenoid valves each connected to one of said pneumatic cylinders connected to said screws and also connected to said cut-off valve pneumatic cylinder for automatically actuating said pneumatic cylinders connected to said screws and said cut-off valve respectively, to move said screws into retaining engagement with said shaft, and to open said cut-off valve to provide communication between the chambers in said hydraulic cylinder, but respectively to permit said hydraulic cylinder piston rod to move freely within said hydraulic cylinder for vertical adjustment of said ram with said shaft being retained in an exact initial position by said screws, and switch means being arranged to actuate said pneumatic cylinders connected to said screws and arranged with said cut-off valve for respectively withdrawing said screws from engagement with said shaft, and to close said cut-off valve to interrupt communication between the chamber of said hydraulic cylinder.

7. A safety device in accordance with claim 1 wherein said pair of pneumatic cylinders connected to said slides are vertically disposed and wherein said means for connecting each of said pneumatic cylinders to said slides includes a rack connected to said pneumatic cylinder, a rack connected to the associated slide, and a pair of idler toothed wheels and meshing with each other and with their respective one of said racks for transmitting the rectilinear movement from one rack to the other rack for horizontal movement of said slides.

8. A safety device in accordance with claim 1 wherein the underside of each of said slides is provided with a recess, and a pair of fixing pins each arranged to be accommodated within one of said recesses and means including a pair of solenoid valves each associated with one of said fixing pins for automatically moving said fixing pins from a retracted position into a locking position seated within the associated recess during the changing of the ram dies.

9. A safety device for a mechanical cam press including a frame and a ram arranged for vertically reciprocating strokes comprising, in combination, a vertically extending shaft, a coupling mounted on the lower end of said shaft, a connecting shaft having an upper end portion readily engageable within said coupling, an intermediate splined portion and a lower end portion of enlarged diameter, a strip fixed on said ram, the portions of said connecting shaft extending out of said coupling being disposed within said strap, a motor on said strap, means for driveably connecting said motor to said splined portion of said connecting shaft for rotation in one direction to disengage said connecting shaft from said coupling and permit said strap to freely follow the adjusting travel of said ram and for rotation in the other direction to threadedly connect said connecting shaft to said coupling and limit switch means for terminating the rotation of said connecting shaft in said other direction when said connecting shaft lower end portion of enlarged diameter reaches a predetermined position in said strap, said vertically extending shaft having a portion of reduced diameter forming a stepped edge, a pair of opposed, independent, horizontally movable slides arranged for reciprocating movement between an advanced position and a retracted position, a pair of pneumatic cylinders operated by control means, means for connecting each of said pneumatic cylinders to one of said slides for moving the said slides reciprocally in opposite directions, said slides in said advanced position having a portion in underlying relationship with said vertically extending shaft stepped edge with a clearance of a few millimeters in the top, dead center position of said vertically extending shaft to thereby prevent the inadvertent downward movement of said vertically extending shaft and therefore said ram by engagement between said stepped edge for said portions of said slides, an interlock means, releaseably engageable with said vertically extending shaft for retaining said vertically extending shaft in an initial position to permit vertical adjustment of said ram.

* * * * *